United States Patent [19]

Reeve

[11] 4,095,097
[45] June 13, 1978

[54] PULSED LIGHT SIGNAL RECEIVER

[75] Inventor: Gerome R. Reeve, Longmont, Colo.

[73] Assignee: Gerald F. Titus, Denver, Colo.

[21] Appl. No.: 753,414

[22] Filed: Dec. 22, 1976

[51] Int. Cl.² .............................................. H04B 9/00
[52] U.S. Cl. ...................................................... 250/199
[58] Field of Search ...................... 250/199, 206, 221; 307/311

[56] References Cited

U.S. PATENT DOCUMENTS

| 3,657,543 | 4/1972 | Rose ................................ 250/199 |
| 3,902,060 | 8/1975 | Neuner et al. ................... 250/199 |

Primary Examiner—Richard Murray
Attorney, Agent, or Firm—Wm. Griffith Edwards

[57] ABSTRACT

A pulsed light signal receiver comprises a photo-sensitive transistor having a base and a collector and an emitter; a load resistance in the collector circuit and a constant current device in the emitter circuit. A capacitor shunting the constant current device over a predetermined range of signal frequencies renders the transistor gain high for such frequencies. The constant current device may be a field effect transistor with its gate at ground potential and a resistance in the source to ground circuit selected to determine the idling current of the FET and provide thermal stability for the phototransistor circuit. A low impedance, balanced-to-neutral, output is provided.

6 Claims, 1 Drawing Figure

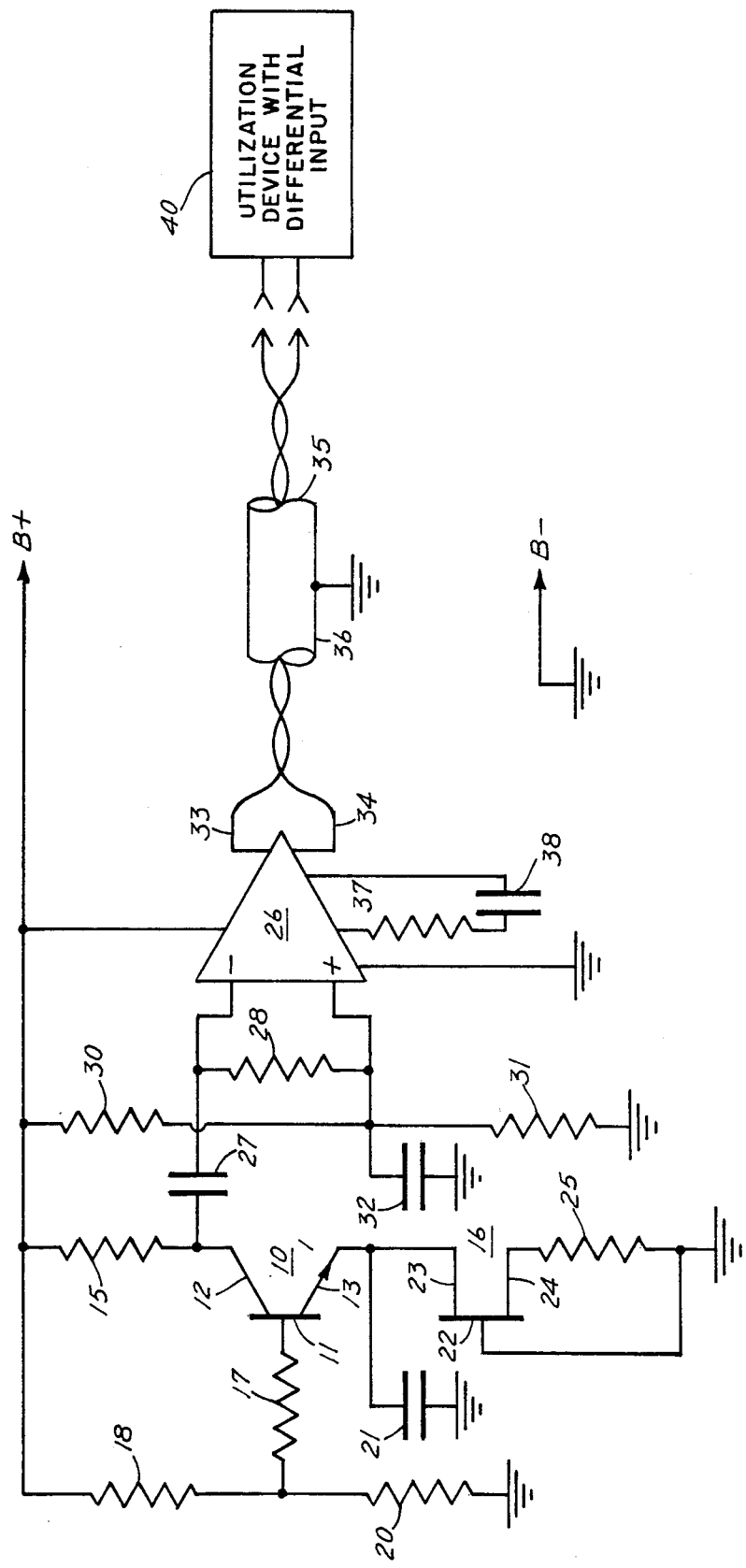

PULSED LIGHT SIGNAL RECEIVER

This invention relates to light responsive receiving apparatus and particularly to an improved high sensitivity receiver for pulsed light signals.

Devices which are sensitive to light have been employed extensively for control purposes and particularly to detect the movement of a body across the path of light from a predetermined source; in other applications such devices have been employed to detect the presence of an object which reflects a beam of light to the receiver under predetermined conditions. Pulsed light has been found highly effective for detection systems required to work in dust laden atmosphere and has the further advantage of being invisible. Various arrangements or controls have been provided for rendering such detection systems free from the effects of ambient light and changes in temperature or the presence of other electromagnetic disturbances. The pulsed light receivers provided heretofore have proved successful for many applications but have not been found completely satisfactory for all applications. Accordingly, it is an object of the present invention to provide an improved and highly reliable system for receiving and detecting pulsed light signals.

It is another object of this invention to provide an improved pulsed light receiver of high sensitivity and which is free from interference due to changes in ambient light conditions.

It is another object of this invention to provide a pulsed light receiver including an improved arrangement for effecting high sensitivity and affording use of the receiver with wide beam light sources.

Briefly, in carrying out the objects of this invention a pulsed light receiver is provided which includes a phototransistor having its base biased to a predetermined constant voltage and having a load resistance in its collector circuit. A constant current device is connected in the emitter circuit of the phototransistor, and a bypass around the constant current device is provided for signals within the predetermined range of frequencies. The output is amplified and converted to a low impedance balanced-to-neutral signal which may be transmitted over a long distance shielded cable without distortion of the signal supplied to a selected utilization device.

The features of novelty which characterize this invention are pointed out with particularity in the claims annexed to and forming a part of this specification. The invention itself, however, both as to its organization and manner of operation, together with further objects and advantages thereof, will best be understood upon reference to the following description taken in connection with the accompanying drawings the single FIGURE of which is a circuit diagram of a receiver embodying the invention.

Referring now to the drawing, a phototransistor 10 having a base 11 and a collector 12 and an emitter 13 is connected between the positive side 14 of a direct current supply and ground or neutral. A load resistance 15 is connected in the collector circuit and a constant current device 16 is connected between the emitter and ground. The base 11 is biased to a constant voltage by a high resistance 17 connected to the mid-point of a divider resistance consisting of equal resistances 18 and 20.

A capacitor 21 is connected between the emitter 13 and ground and bypasses the constant current device 16 through a predetermined range or band of frequencies.

The device 16 is selected to maintain constant current at a value at which the phototransistor 10 has optimum sensitivity consistent with thermal stability. In the illustrated embodiment, the constant current device 16 has been shown as an FET transistor having a gate 22, a drain terminal 23 and a source terminal 24. The gate 22 is connected directly to ground and the source is connected to ground through a resistance 25 which is adjusted or selected to have a value at which the phototransistor 10 will have optimum performance. The constant current device 16 presents a high impedance which may be of the order of over 10 megohms and causes severe degeneration due to negative current feedback in the emitter 13. The effect of the negative current feedback is to reduce the gain of the phototransistor 10 to a very low value for steady state and for slowly varying light signals. The effect of temperature changes in the operating point of the transistor is also reduced to a negligible amount.

The bypass capacitor 21 shunts the aforesaid predetermined range or band of frequencies around the constant current device 16 and thus restores the gain of the phototransistor 10 to a high value for the predetermined band of frequencies. The value of the capacitor 21 preferably is chosen to optimize the gain for a particular pulse length of the pulsed light signals. The output of the phototransistor 10 appears across the resistance 15 and is impressed on an integrated circuit 26 through a capacitor 27. A resistance 28 connected across the terminals of the integrated circuit 26 acting with the capacitor 27 provides a high pass filter which optimizes the pulse response of the integrated circuit by removing lower frequency components of the signals. Resistances 30 and 31 connected in series between the positive side of the supply and ground provide a divider for bypassing the integrated circuit and a capacitor 32 connected between the common terminals of the resistances 30 and 31 and ground provides an alternating current ground for the lower terminal of the integrated circuit. Signals within the desired range of frequencies are amplified by the integrated circuit 26 which is arranged to provide a low impedance balanced-to-ground signal at its output leads 33 and 34. This signal can be fed over long lengths of shielded cable without distorting the wave shape of the pulsed signal such cable being illustrated as a twisted pair 35 within a grounded shield 36.

The frequency response of the integrated circuit can be shaped by adjusting or selecting a resistance 37 and a capacitor 38 for the purpose of enhancing the pulsed response. The shielded pair 35 is connected to a suitable utilization device 40 having a differential input and which may, for example, include a relay for actuating a device to be controlled in response to the light signal received at the phototransistor 10.

The receiver as described above has been found highly effective for various uses including installations where smoke or other foreign matter is present around the sensing equipment. For the purpose of illustration and not by way of limitation a receiver embodying the invention was constructed using the components and the values of the resistances and capacitances as follows:

The phototransistor 10 was an OP805 by Optron Incorporated of Carrollton, Tex. The constant current device 16 including the resistance 25 was provided by an IN5283 "Current Regulator Field Effect Diode" made by Teledyne Crystalonics. The integrated circuit 26 was an LM733CH.

The resistances were:
15 – 15000 ohms
17 – 5.1 megohms
18 – 3300 ohms
20 – 4700 ohms
28 – 15000 ohms
30 – 1000 ohms
31 – 1000 ohms
37 – 100 ohms The capacitances were:
21 – 0.01 mfd.
27 – 0.005 mfd.
32 – 10 mfd.
38 – 1 mfd.

This receiver was found to be highly effective in operation.

While the invention has been described in connection with a specific circuit and application modifications will occur to those skilled in the art. Therefore, it is not desired that the invention be limited to the details illustrated and described and it is intended by the appended claims to cover all modifications which fall within the spirit and scope of the invention.

I claim:

1. A receiver for pulsed light signals comprising:
   a pulsed light detecting means including a phototransistor having base and collector and emitter electrodes,
   means for biasing the base of said transistor to a constant voltage,
   a load resistance in the collector circuit of said transistor,
   a signal output connected to said load resistance,
   a constant current device in the emitter circuit of said transistor, and
   a capacitor for bypassing current within a predetermined range of frequencies around said constant current device whereby the gain of said phototransistor is high for signals in said range of frequencies.

2. A receiver for pulsed light signals as set forth in claim 1 wherein said constant current device is a two terminal current regulator.

3. A receiver for pulsed light signals as set forth in claim 1 wherein said constant current device is a field effect transistor having a gate and drain and source connections, means providing a zero potential to ground for said gate, and resistance between said source and ground for setting the idling current of said field effect transistor to a value for high thermal stability and good sensitivity of said phototransistor.

4. A receiver for pulsed light signals as set forth in claim 1 wherein said constant current device has high impedance and effects high degeneration due to negative current feedback in the emitter circuit whereby the gain of the phototransistor is reduced for steady state and slowly varying signals.

5. A receiver for pulsed light signals as set forth in claim 1, including means having a pair of output leads and associated with said signal output for providing a low impedance balanced-to-neutral signal output.

6. A receiver for pulsed light signals as set forth in claim 5 including a two wire shielded cable connected to said leads for transmitting the output over an extended distance without distortion of the wave shape of the signal output, and a signal detecting device having a differentially connected input to said cable for utilizing said output signals.

* * * * *